United States Patent
Johannsen

(10) Patent No.: US 10,589,808 B2
(45) Date of Patent: Mar. 17, 2020

(54) SPLINED IDLER FOR SCALLOP RESISTANCE

(71) Applicant: Caterpillar Inc., Deerfield, IL (US)

(72) Inventor: Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/247,799

(22) Filed: Jan. 15, 2019

(65) Prior Publication Data

US 2019/0144056 A1    May 16, 2019

Related U.S. Application Data

(63) Continuation of application No. 15/253,363, filed on Aug. 31, 2016, now Pat. No. 10,227,099.

(51) Int. Cl.
*B62D 55/14* (2006.01)
*B62D 55/21* (2006.01)
*B62D 55/06* (2006.01)

(52) U.S. Cl.
CPC .............. *B62D 55/14* (2013.01); *B62D 55/21* (2013.01); *B62D 55/06* (2013.01)

(58) Field of Classification Search
CPC ....... B62D 55/14; B62D 55/145; B62D 55/21
See application file for complete search history.

(56) References Cited

U.S. PATENT DOCUMENTS

| | | | |
|---|---|---|---|
| 2,511,098 A | 6/1950 | Bridwell | |
| 3,603,650 A | 9/1971 | Miller | |
| 3,937,528 A | 2/1976 | Clemens | |
| 5,908,226 A | 6/1999 | Courtemanche | |
| 6,250,726 B1 | 6/2001 | Burdick et al. | |
| 6,652,043 B2 | 11/2003 | Oertley | |
| 7,237,631 B2 | 7/2007 | Livesay et al. | |
| 7,823,990 B2 | 11/2010 | Angot | |
| 7,963,014 B2 | 6/2011 | Bradberry et al. | |
| 8,540,325 B2 | 9/2013 | Diekevers et al. | |
| 9,045,180 B2 | 6/2015 | Brewer et al. | |
| 10,227,099 B2 * | 3/2019 | Johannsen | B62D 55/21 |
| 2005/0253453 A1 | 11/2005 | Miller | |
| 2008/0217994 A1 | 9/2008 | McRae | |
| 2010/0072813 A1 | 3/2010 | McRae | |
| 2012/0153713 A1 | 6/2012 | Yelistratov | |
| 2014/0001825 A1 | 1/2014 | Hakes | |
| 2014/0091615 A1 | 4/2014 | Knobloch | |
| 2016/0131544 A1 | 5/2016 | Rust | |
| 2016/0137239 A1 | 5/2016 | Steiner et al. | |
| 2016/0178483 A1 | 6/2016 | Sidles | |

FOREIGN PATENT DOCUMENTS

| | | |
|---|---|---|
| FR | 367529 | 10/1906 |
| JP | 2565127 Y2 | 3/1998 |
| WO | 2011030994 A1 | 3/2011 |

* cited by examiner

*Primary Examiner* — Kip T Kotter
(74) *Attorney, Agent, or Firm* — Law Office of Kurt J. Fugman LLC

(57) ABSTRACT

An idler wheel for use with a track chain of a vehicle that includes a plurality of track pins and bushings comprises a main body that includes a generally cylindrical configuration defining an axis of rotation, a circumferential direction and a radial direction, the main body including a central portion disposed along the axis of rotation defining an axial extremity of the radial portion, and at least a first outside portion disposed along the axis of rotation that includes an undulating circumferential perimeter.

20 Claims, 8 Drawing Sheets

SPLINED IDLER FOR SCALLOP RESISTANCE

CROSS-REFERENCE TO RELATED APPLICATION

This continuation application claims the benefit of U.S. patent application Ser. No. 15/253,363 filed on Aug. 31, 2016, entitled "Splined Idler for Scallop Resistance", the contents of which is hereby incorporated by reference in its entirety.

TECHNICAL FIELD

The present disclosure relates to an idler wheel that is used as a part of a track chain assembly attached to the undercarriage of track-type vehicles used for off-road operations such as those that use endless tracks for moving on the ground. Specifically, the present disclosure relates to an idler wheel that is configured to reduce the scalloping of track links that may lead to track chain and machine maintenance.

BACKGROUND

In many current applications, track links that are part of track chains develop a scallop pattern on their top or rail surfaces that contact various drive and support members of the undercarriage including rollers and idler wheels. The scallops look like depressions on the rail surface of the links. These depressions are caused by contact of the rollers and the idler in a consistent place on the link as the track chain continuously revolves around on the drive sprocket, idler wheels and the rollers. In many cases, the track links have rails with a center portion that is thicker in a direction parallel to the axis of rotation of the idler wheel as compared to a similar thickness of the end portions. Consequently, an idler wheel and roller tend to contact the center portion more completely and less completely at the ends where that portion of the link is not overlapped by an adjacent link. This leads a deeper more complete scallop, often referred to as a primary scallop, being formed at the center of the rail portion of the track link, while a secondary scallop that this less complete may be formed at the end portions of the rail of the track link. These secondary scallops are often positioned at the ¼ position of the rail, measured from the front of the rail, and at the ¾ position of the rail, also measured from the front of the rail, while the primary scallop would be located between the ¼ and ¾ positions.

Scalloped track links may lead to various problems. For example, over time, the manner in which the idler wheel and rollers contact the links may become uneven, causing vibration that may lead to an uncomfortable ride. Also, this may lead to maintenance issues for the undercarriage and the machine.

SUMMARY

An undercarriage for use with a vehicle that includes an endless track drive is provided. The undercarriage comprises a track chain including a plurality of track pins and track bushings disposed about the track pins, and a plurality of track links that are connected to each other by either a track pin or a track bushing, wherein at least one track link comprises defines a plurality of apertures for receiving a track pin or bushing. The undercarriage may further comprise an idler wheel including a main body that includes a generally cylindrical configuration defining an axis of rotation, a circumferential direction and a radial direction, the main body including a central portion disposed along the axis of rotation defining a radial extremity of the central portion, and at least a first outside portion disposed along the axis of rotation that includes an undulating circumferential perimeter with a plurality of apexes and valleys. The undulating circumferential perimeter may be exposed and configured to contact the plurality of track links of the track chain tangentially without contacting one of the plurality of track bushings.

A machine comprising an undercarriage is provided. The undercarriage may comprise a track chain including a plurality of track pins and track bushings disposed about the track pins, and a plurality of track links that are connected to each other by either a track pin or a track bushing, wherein at least one track link comprises defines a plurality of apertures for receiving a track pin or bushing. The undercarriage may further comprise an idler wheel including a main body that includes a generally cylindrical configuration defining an axis of rotation, a circumferential direction and a radial direction, the main body including a central portion disposed along the axis of rotation defining a radial extremity of the central portion, and at least a first outside portion disposed along the axis of rotation that includes an undulating circumferential perimeter with a plurality of apexes and valleys. The undulating circumferential perimeter may be exposed and configured to contact the plurality of track links of the track chain tangentially without contacting one of the plurality of track bushings.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
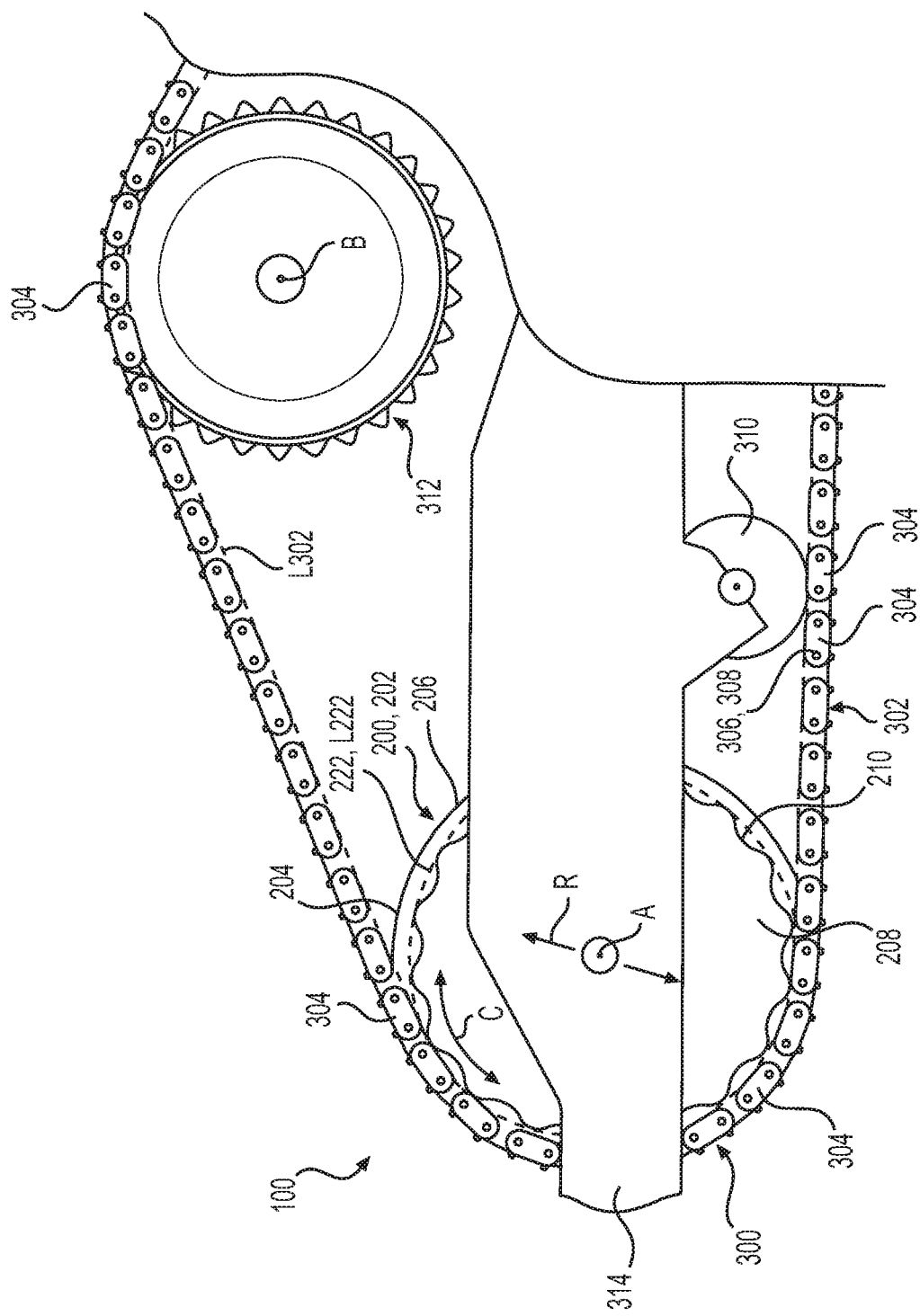
FIG. 1 is a side enlarged view of an idler wheel according to an embodiment of the present disclosure used with a track chain assembly as part of a machine undercarriage.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include an idler wheel that is configured to reduce the scalloping of track links. This may be accomplished in a number of ways such as by providing an undulating contact surface on the idler wheel that contacts the track link in a different position most the time the idler wheel contacts that particular track link. To this end, the idler wheel may have an undulating profile that is consistent or varying about the circumferential perimeter of the idler wheel, that has an odd number of contacting portions about the circumference of the idler wheel, and/or the effective tangential circular distance about the circumference of the undulating profile may not be evenly divisible into the linear length of the track chain that the idler wheel is intended to contact, etc.

Figure 2:
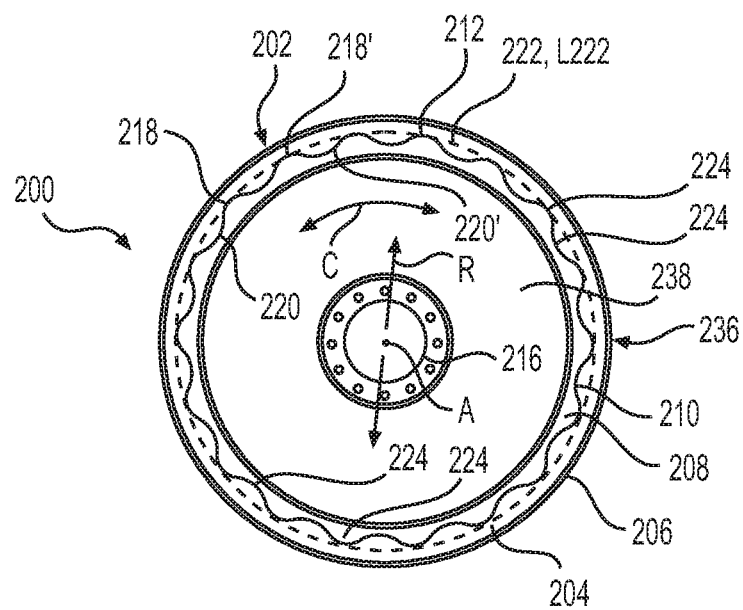
FIG. 2 is a side view of the idler wheel of FIG. 1 shown in isolation from the machine undercarriage.
Figure 3:
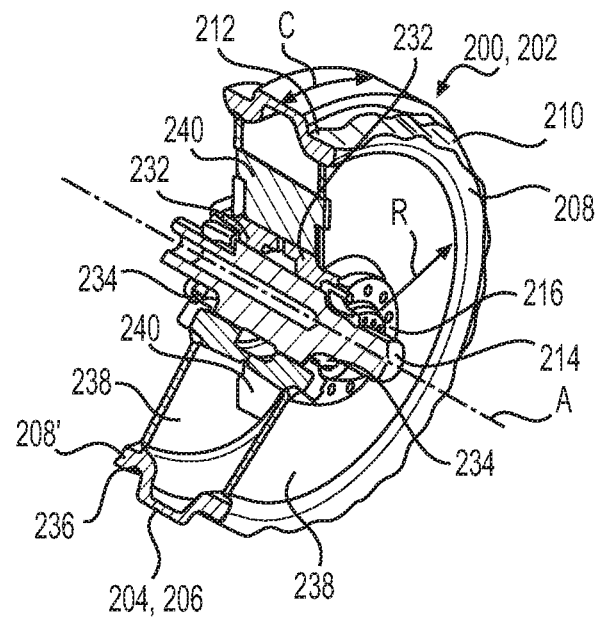
FIG. 3 is a perspective view of the idler wheel of FIG. 2 shown in partial cross-section to show various components of the rotating connection of the idler wheel to the axle.

FIGS. 1 thru 3 illustrate an embodiment of an idler wheel 200 and undercarriage system 300 according to the present disclosure. The undercarriage system 300 of FIGS. 1 and 3 is directed to a track chain assembly 302 using a plurality of straight track links 304, so called, as its cross-sectional area does not vary from one end to the other. It is to be understood that the configuration of the track link for any embodiment discussed herein may be varied as needed or desired. Any embodiment of a track link described herein may be used as part of a track chain assembly of a vehicle 100 that includes a plurality of track pins and bushings. This will be described in further detail later herein.

Starting with FIGS. 1 and 3, an undercarriage 300 for use with a vehicle that includes an endless track drive is shown. The undercarriage 300 comprises a track chain assembly 302 including a plurality of track pins 306 and track bushings 308 disposed about the track pins 306, and a plurality of track links 304 that are connected to each other by either a track pin 306 or a track bushing 308, wherein at least one track link 304 comprises defines a plurality of apertures for receiving a track pin or bushing.

Looking at FIGS. 1-3, a rear idler wheel 200 is also shown that includes a main body 202 that includes a generally cylindrical configuration defining an axis of rotation A, a circumferential direction C and a radial direction R. The main body 202 includes a central portion 204 disposed along the axis of rotation A defining radial extremity 206 of the central portion 204, and at least a first outside portion 208 disposed along the axis of rotation A that includes an undulating circumferential perimeter 210. The radial extremity 206 of the central portion 204 may nor may not be configured to make contact with the bushings 308 of the track chain assembly 302.

In addition to the idler wheel 200 being shown to have a rotating attachment to the frame 314 of the undercarriage 300, a support roller 310 and a drive sprocket 312 are also shown to have rotating attachments to the frame 314, represented by rotation axes A and B respectively in FIG. 1. As also shown in FIG. 1, an elevated configuration (drive sprocket is elevated) of an undercarriage system 300 is shown but it is contemplated that other embodiments could use an inline configuration as will be described later herein.

For this embodiment as shown in FIGS. 2 and 3, the undulating circumferential perimeter 210 defines a radial extremity 212 of the first outside portion 208 of the idler wheel 200, wherein the radial extremity 206 of the central portion 204 is further away from the axis of rotation A than the radial extremity 212 of the first outside portion 208 along the radial direction R. This may not be the case in other embodiments. Similarly, the central portion 204 may include an axial offset (not shown in FIGS. 2 and 3) near its radial extremity 206 but this may not be the case in other embodiments.

FIG. 2 shows a hub 216 that may be used to attach the idler wheel 200 to the axle of the machine. The axle 214 and other parts of the idler wheel assembly 200 are shown in FIG. 3. The axle 214 is surrounded by bearings 232. Rotating face seals 234 are also employed as is known in the art to hold lubrication such as oil in the rotating joint. The rim portion 236 of the idler wheel assembly 200 is connected to the hub 216 via a pair of annular shaped plates 238 that are supported and interconnected by spoke members 240 contained within the idler wheel assembly 200. Idler wheels of other configurations including having unitary construction are also contemplated to be within the scope of the present disclosure.

As can be seen best in FIG. 3, the main body 202 includes a second outside portion 208' that is positioned on the axially opposite side of the central portion 204 compared to the first outside portion 208, wherein the second outside portion 208' is similarly configured as the first outside portion 208. For this embodiment, the idler wheel 200 is symmetrical about an axial plane AP centered on the axis of rotation A of the idler wheel 200 (see FIG. 4). Other embodiments may be asymmetrical.

As best seen in FIG. 2, the undulating circumferential perimeter 210 of the idler wheel 200 includes a plurality of apexes 218 and valleys 220. An apex or valley is that portion of the perimeter 210 where the inflection of the perimeter changes, that is to say, a tangent to the perimeter changes its slope from a positive slope to a negative slope, or vice versa. A curve 222 may be defined about the circumferential perimeter 210 of the first outer 208 portion that is tangent to every apex 218 of the undulating circumferential perimeter 210. As shown, the curve 222 is a circle but this may not be true for other embodiments.

As best understood by referring to FIGS. 1, 2, and 7-9, the track chain assembly 302 defines a track chain length L302 and the circle 222 defines a circumferential length L222, and the track chain length L302 divided by the circumferential length L222 of the circle yields a non-integer value in some embodiments. This helps to ensure that the apex 218 of the undulating perimeter 210 will contact a different spot most the time the idler wheel 200 contacts a particular link 304. This helps reduce the likelihood of scalloping the link 304.

Focusing now on FIG. 2, each curve segment 224 of the undulating perimeter 210 includes an arcuate shape. It is contemplated that in some embodiments that the curve segment 224 could be a concavely shaped radius, as would be the case for a valley 220, and a convexly shaped radius, as would be the case for an apex 218. These radii could transition from one to the other directly, or indirectly, as would be the case if a straight or flat curve joined them together. Any suitable undulating perimeter may be used in other embodiments including zig-zagged with rounded peaks, squared with rounded corners, sinusoidal, polynomial such as a spline, involute, etc.

Figure 6:
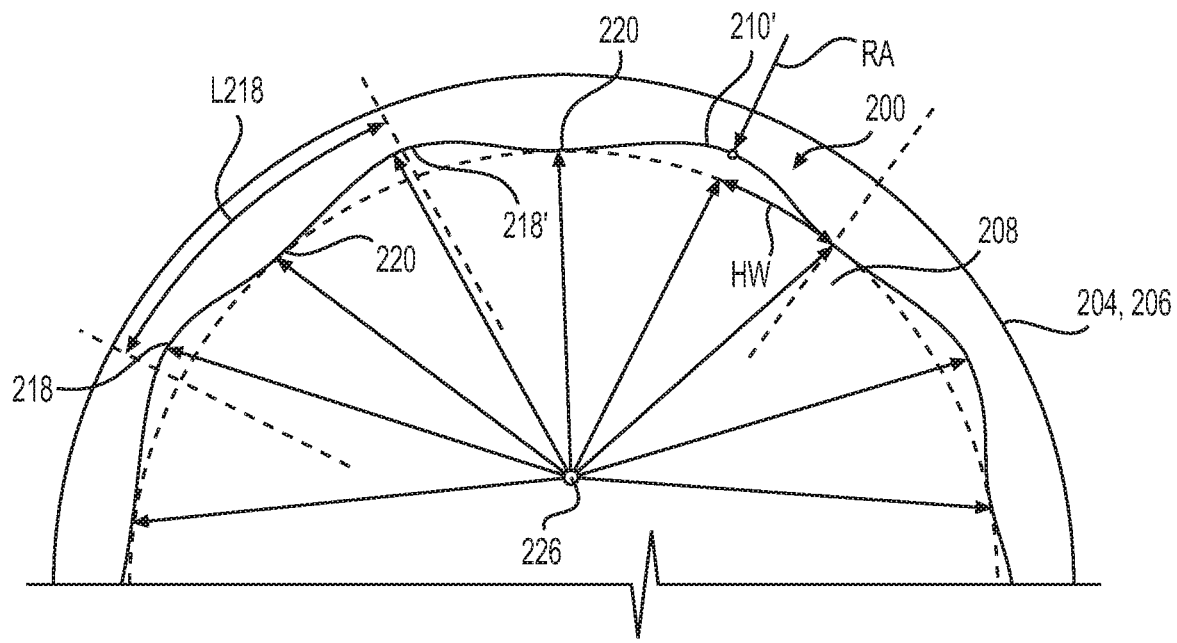
FIG. 6 is an enlarged front view of an idler wheel according to an embodiment of the present disclosure to show more clearly the dimensions of the undulations that may be employed.

In yet other embodiments, the undulating circumferential perimeter 210 may include an odd number of apexes 218 that helps to ensure that an apex 218 contacts a different portion of a particular track link 304 most the time as the track link 304 revolves around the undercarriage 300 and contacts the idler wheel 200 once more. Also, as best seen in FIG. 6, the linear circumferential distance L218 from one apex 218 to the next apex 218' may be the same about the entire circumferential perimeter 210 of the first outer portion 208 of the idler wheel 200. In such a case or in other embodiments, the undulating circumferential perimeter 210 may comprise a circular array 226 of repeating geometrical apexes 218 and valleys 220 about the axis of rotation A. This consistency may not be present in other embodiments. The dimensions of the undulating perimeter 210 may be approximately measured like a sinusoidal waveform or the like, having a radial amplitude RA and a half wavelength HW. It is contemplated that the amplitude RA may range from 5-10 mm and that the half wavelength HW may range from 10-160 mm in various embodiments.

Figure 4:
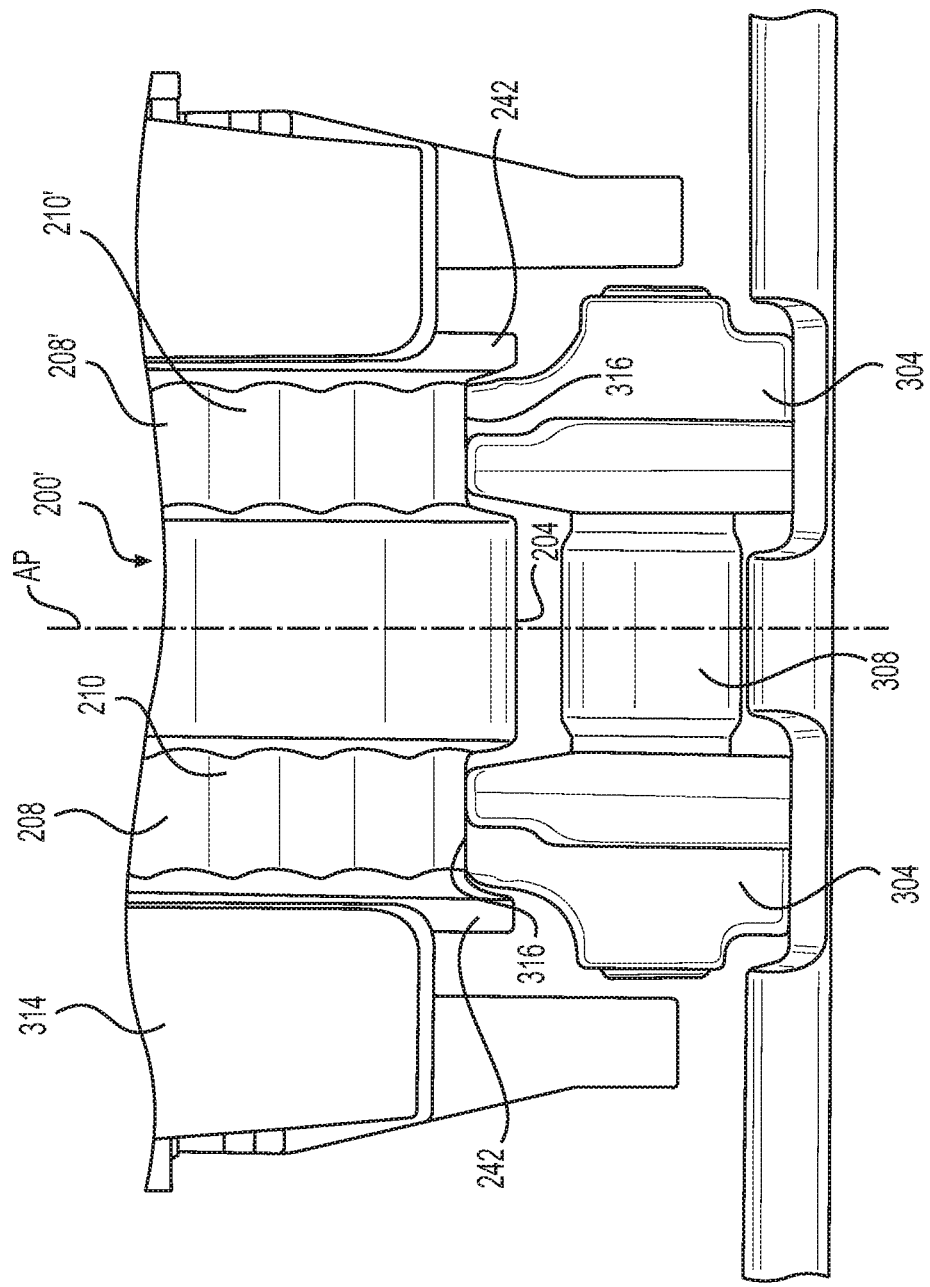
FIG. 4 is a front view of a track chain assembly and idler wheel according to an embodiment of the present disclosure, showing how the idler wheel contacts the top rails of the track links.

FIG. 4 depicts another version of the idler wheel 200' with outside flanges 242. As shown, the idler wheel 200' contacts the rails 316 of the track links 304. For this embodiment, the flanges 242 are positioned closely to the outside of the rails 316 of the links 304, helping to prevent lateral movement of the track chain assembly 302 with respect to the idler wheel 200'. The central portion 204 of the idler wheel 200' does not contact the bushing 308 and the outer portions of the idler wheel 200 have undulating circumferential perimeters 210 in a manner consistent with what has been described with reference to FIGS. 1-3.

Figure 5:
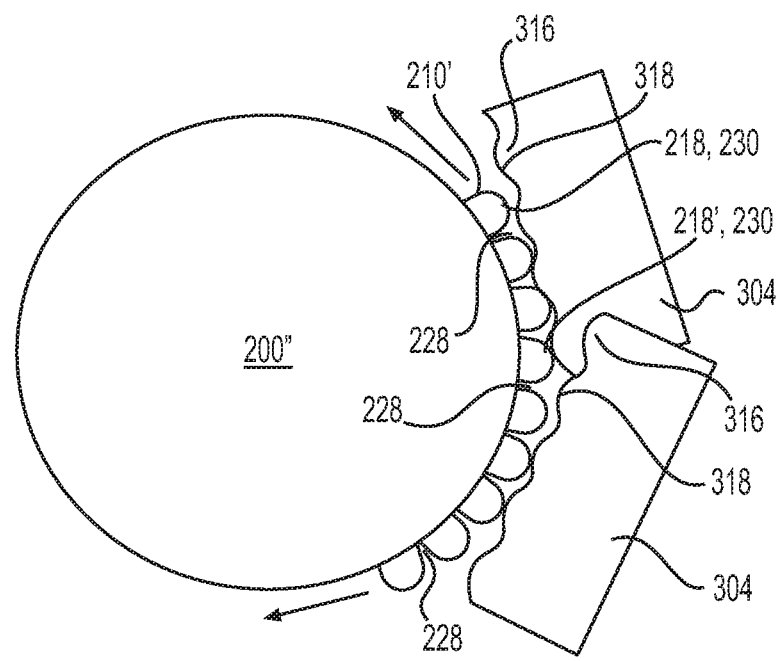
FIG. 5 is a simplified schematic view of another embodiment of an idler wheel according to the present disclosure.

Looking at FIG. 5, the plurality of track links 304 may include a rail portion 316 that is configured to complimentarily mate with the circumferentially undulating perimeter 210' of the idler wheel 200". This may involve the provision of an undulating surface 318 on the rail portion 316 of the link 304. For the embodiment depicted in FIG. 5, the undulating circumferential perimeter 210' is interrupted along the circumferential direction C of the idler wheel 200'. That is to say, there are gaps 228 between the undulations. Each portion of the idler wheel 200' that forms an apex 218 may be referred to as a spline 230. As shown in FIGS. 1 and 2, the undulations may be continuous or uninterrupted in other embodiments. The rail surface of other track links may be flat as illustrated in FIGS. 1 and 4.

INDUSTRIAL APPLICABILITY

In practice, a track chain assembly and/or an idler wheel may be sold, manufactured, bought etc. and attached to the machine in the aftermarket or original equipment scenarios. That is to say, the machine may be sold with the track chain assembly and idler wheel according to embodiments described herein or the machine may be retrofitted, repaired, refurbished to use any of the embodiments discussed herein. The idler wheel may be machined from a single piece of material to provide a suitable undulating profile that is intended to contact the links of the track chain assembly or the idler wheel may include an assembly of multiple components. In other embodiments, the splines may be added to the idler wheel by fastening, welding, etc. Continuous undulating profiles may also be added as one piece or in segments to an idler wheel, etc.

Figure 7:
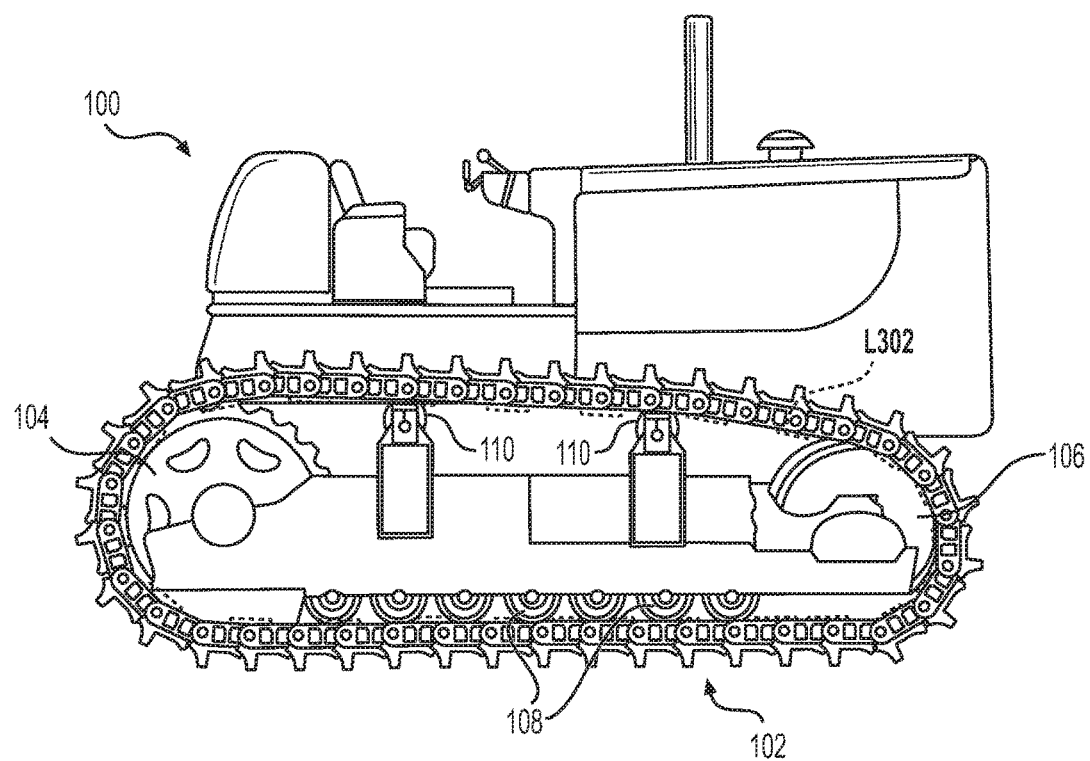
FIG. 7 is a side view of a tractor using an endless track chain that may use an idler wheel in accordance with various embodiments of the present disclosure.

FIG. 7 illustrates a track-type tractor 100 employing a pair of endless track chain assemblies 102 (one shown) of this invention thereon. Although the track assembly is particularly adapted for use on a tractor, it should be understood that the track assembly will find application to other vehicles, such as track-type excavators or any other type of off-road vehicle or machinery. In the tractor application illustrated in FIG. 7, each track chain assembly 102 is mounted in a conventional manner on a drive sprocket 104, an idler 106, a plurality of longitudinally spaced track rollers 108, and a pair of upper guide or carrier rollers 110, when needed. The idler wheel may be substituted with idler wheel 200, 200', etc. as described earlier herein. Also, the links of the track chain assembly 102 of FIG. 7 are shown to be offset links instead of straight links as shown in FIG. 1.

Figure 8:
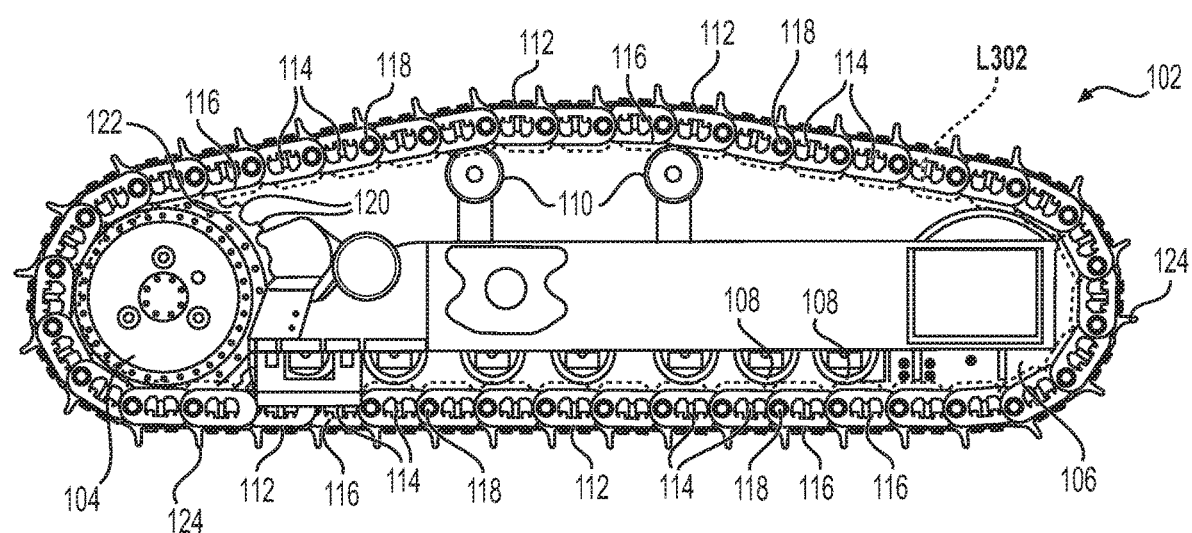
FIG. 8 is a side view of an endless track that is similar to that disclosed in FIG. 7 but is isolated from the tractor, illustrating more clearly an in-line configuration of endless track.
Figure 9:
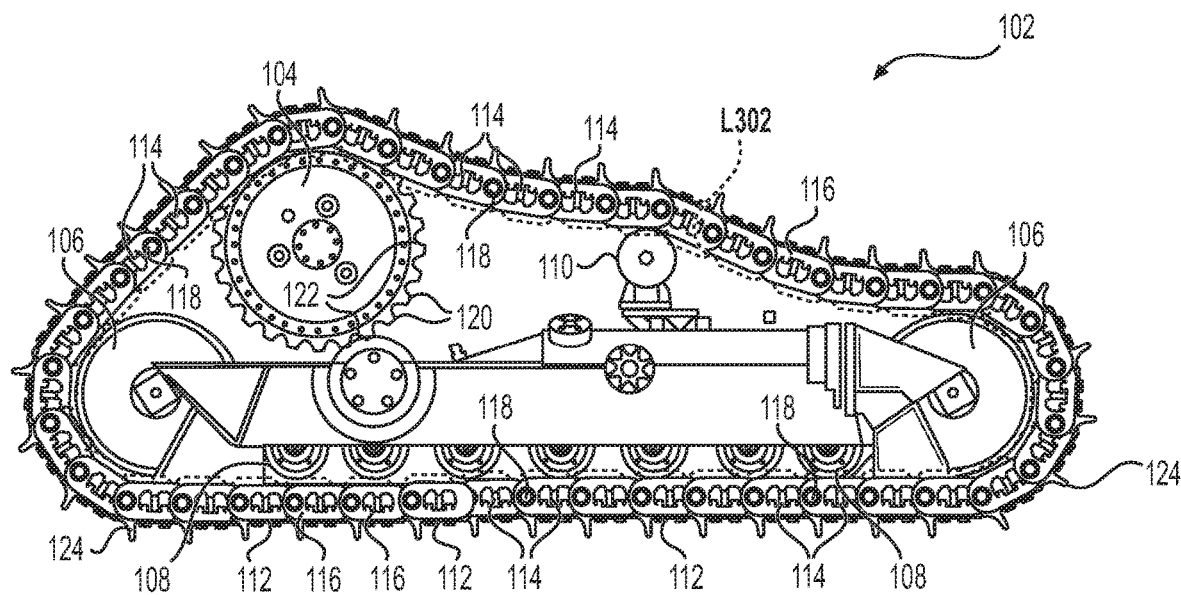
FIG. 9 is a front view of an endless track similar to that shown in FIG. 8 except that is uses an elevated drive sprocket.

Referring to FIGS. 8 and 9, a track assembly 102 comprises a plurality of track shoes 112 which are pivotally interconnected by an articulated link assembly 114. Link assembly 114 is disposed intermediate the widths of track shoes 112 and includes a plurality of pairs of links, pivotally interconnected together by standard pin and bushing assemblies 118. The teeth 120 of drive sprocket 104 engage the bushings of pin and bushing assemblies 118 to drive track assembly 102 in a conventional manner with the track assemblies being guided by idler 106 and rollers 108 and 110 which engage upper rail portions of links. The main difference between the configurations of the track assembly of FIGS. 8 and 9 is that FIG. 8 is an inline configuration, so called as the drive sprocket is in-line with the front idler wheel forming a substantially ovular path for the track, while FIG. 9 shows an elevated configuration, so called as the drive sprocket is vertically above the lower idler wheels forming a substantially triangular path for the track. Again, idler wheels 106 in FIGS. 8 and 9 may be substituted with idler wheels 200, 200', 200" etc. as described earlier herein.

With continued reference to FIGS. 8 and 9, the lower rollers are often called track rollers 108 as they support the weight of the vehicle and transfer it to the track and then to the ground while the upper rollers are often called carrier rollers 110 as they only carry or support the track, limiting or sometimes modifying the catenary hang of the track. The drive sprockets 104 have segments 122 with drive teeth 120 connected to them or integrally formed therewith that mesh with the links in the track chain assembly 102, powering movement of the track, and thus the vehicle. The shoes 112 include provide movable platforms that engage the ground and include ribs or grousers 124 that penetrate the ground, providing traction. The idler wheels 106 lack teeth but ride between the links (see G in FIG. 5) and on top of the rails of the links, limiting side to side movement of the track. Similarly, the rollers 108, 110 provide a conduit for the transfer of weight, and in many cases, provide a way to adjust the tension in the track. The rollers 108, 110 also ride between the links 116 and on top of the rails of the links, limiting side to side movement of the track.

Figure 10:
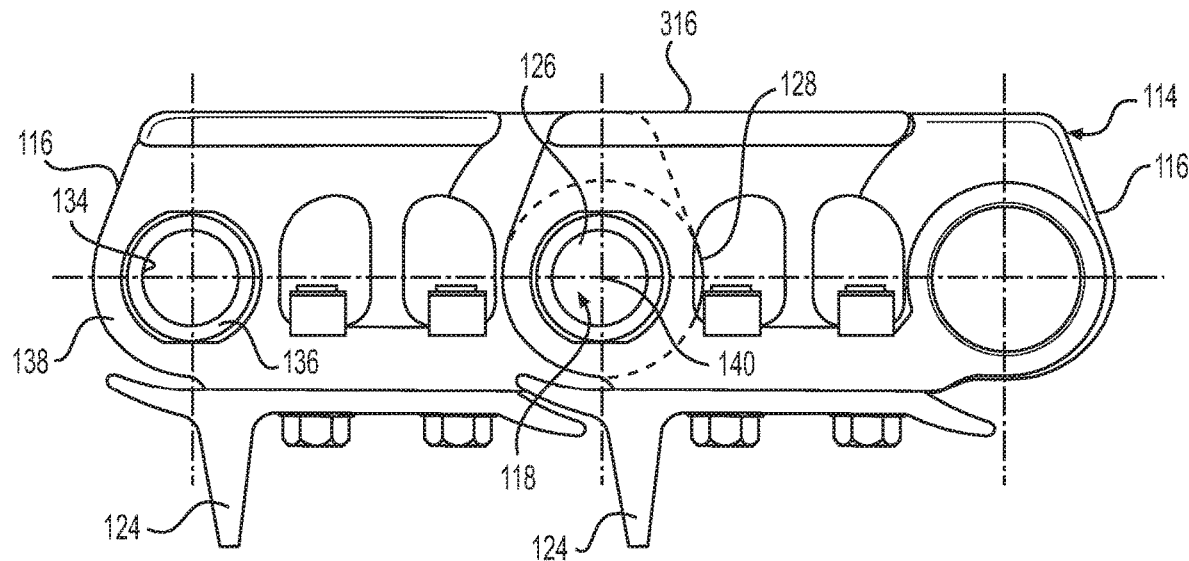
FIG. 10 is an enlarged front view of a pair of track links that are joined together by a track pin and bushing in a manner that is similar to the tracks illustrated in FIGS. 8 and 9.
Figure 11:
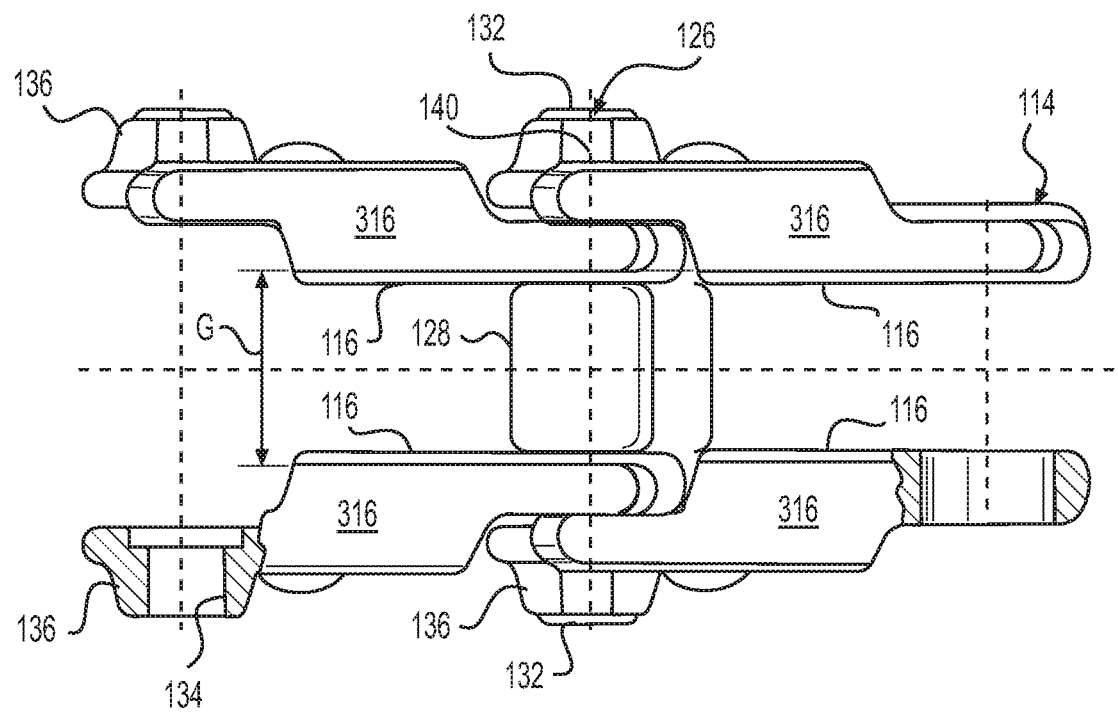
FIG. 11 is a top view of the track links, bushing and track pin of FIG. 10. The track shoes are removed for extra clarity.

Turning now to FIGS. 10 and 11, they show an example of a link assembly 114 that includes a pair of track links that are joined together by a track pin and bushing assembly 118 in a manner consistent with the tracks illustrated in FIGS. 8 and 9. The track pin and bushing assembly 118 form a joint that includes a cylindrical pin 126, and a rotatable tubular bushing 128. The pin 126 has opposite end portions 132 (best seen in FIG. 11), each of which is pressed and non-rotatably mounted into a respective one of the bores 134 formed by a protruding boss 136 of the outboard end collars 138 of each link 116 in a link set 114. The pin and bushing assembly 118 further includes a method and device for mechanically interlocking the pin 126 within such bores 134 to prevent any axial movement of the links 116 along a longitudinal or cylindrical axis 140 of the pin 126.

Other types of methods for mechanically interlocking the pin to the links that are known or that will be devised in the art may be employed. One mechanically interlocking method comprises a circumferentially disposed, generally arcuately shaped groove formed about each of the end portions of the pin and at least one mechanically formed nodule which protrudes radially inwardly from each of the bores into a respective one of the grooves. The mechanically formed nodules are preferably formed by using a punch device. Preferably, a pair of such punch devices are located perpendicular to the pin axis on each of the flats provided on the pin boss. The application of a sufficient force of the punch devices will result in the extrusion of the boss metal into the groove. Other methods for achieving this are also available and may be used.

Figure 12:
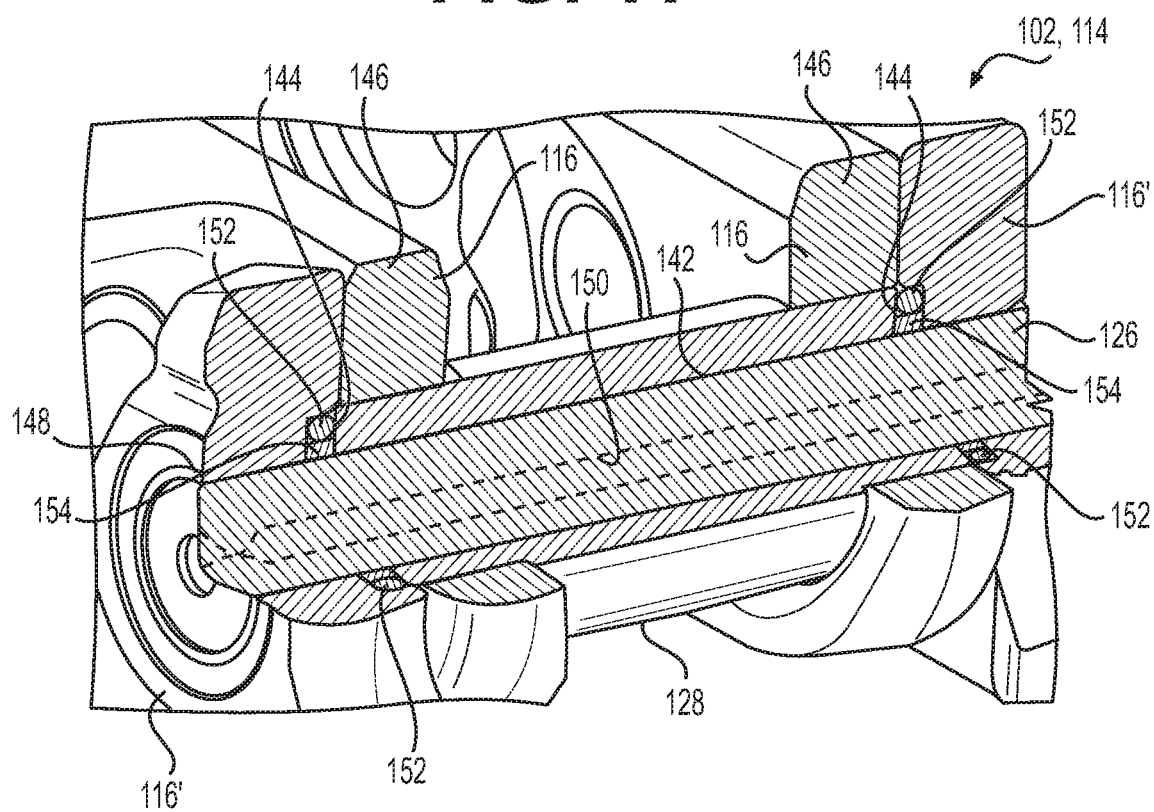
FIG. 12 is a perspective sectional view of track links, a bushing and track pin that is similar to that shown in FIG. 11.

Referring to FIG. 12, there is shown a portion of an undercarriage for a track-type machine that uses a track chain assembly 102 and link assembly 114 that are similar to those described thus far herein. The tubular bushing 128 is provided with a pin bore 142 which is of a size sufficient to freely rotatably mount the bushing 128 about the pin 126. Bushing 128 has a pair of opposite end faces 144 and is of a size to extend between and to freely rotatable relative to the inboard end collars 146.

As shown in FIG. 12, each link assembly includes inboard links and outboard links. Inboard links and outboard links may be coupled together with a plurality of additional inboard and outboard links (not shown), to form an endless chain extending about a conventional drive mechanism including one or more track idlers and a drive sprocket. This may be used in a variety of track-type machines, such as a track-type tractor, tracked excavator, tracked loader, or the like. One practical implementation of the teachings set forth herein is contemplated to be in track-type tractors used in particularly harsh field conditions, such as mines and landfills.

The track pin 126 may be press fit with outboard links. In one embodiment, retention rings 148 or some other mechanism for positive pin retention may be coupled with pin 126 to enhance the strength of the coupling with outboard links 200, 200'. In the embodiment shown, inboard links and outboard links include S-shaped or offset links, however the present disclosure is not limited in this regard and straight link track might also be used. During operation as already discussed, one or more track idlers and a drive sprocket may engage with the bushing 128 to guide and provide power to the track in a conventional manner. As will be familiar to those skilled in the art, some structure for lubricating surfaces which move against one another within the track assembly may be desirable. To this end, the pin 126 may include an oil passage 150 which serves as an oil reservoir for supplying oil to desired locations within track segment.

During track assembly at the factory or during track repair or servicing, lubricating oil may be supplied into passage 150, and the oil passage may be plugged to seal the lubricating oil therein. A set of seals 152 may also be provided, which fluidly seal between outboard links and bushing 128 to retain oil within the link assembly 114. The link assembly 114 also includes a set of thrust rings 154, each positioned between the bushing 128 and one of outboard links 116'. Thrust rings 154 can react to thrust loads through the link assembly 114 and may be configured to prevent compressive forces on seals 152 which can otherwise impart a tendency for seals to fail. Each of thrust rings 154 may be uniquely configured to provide a robust mechanism for reacting thrust loads, but also facilitate the transfer into and maintaining of oil within a region of the link assembly 114 defined between bushing 128 and outboard links, and also between each seal 152 and the pin 126. It should be noted that the oil passage is shown in dotted lines, indicating that in certain embodiments, it may not be present, such as will now be described.

Figure 13:
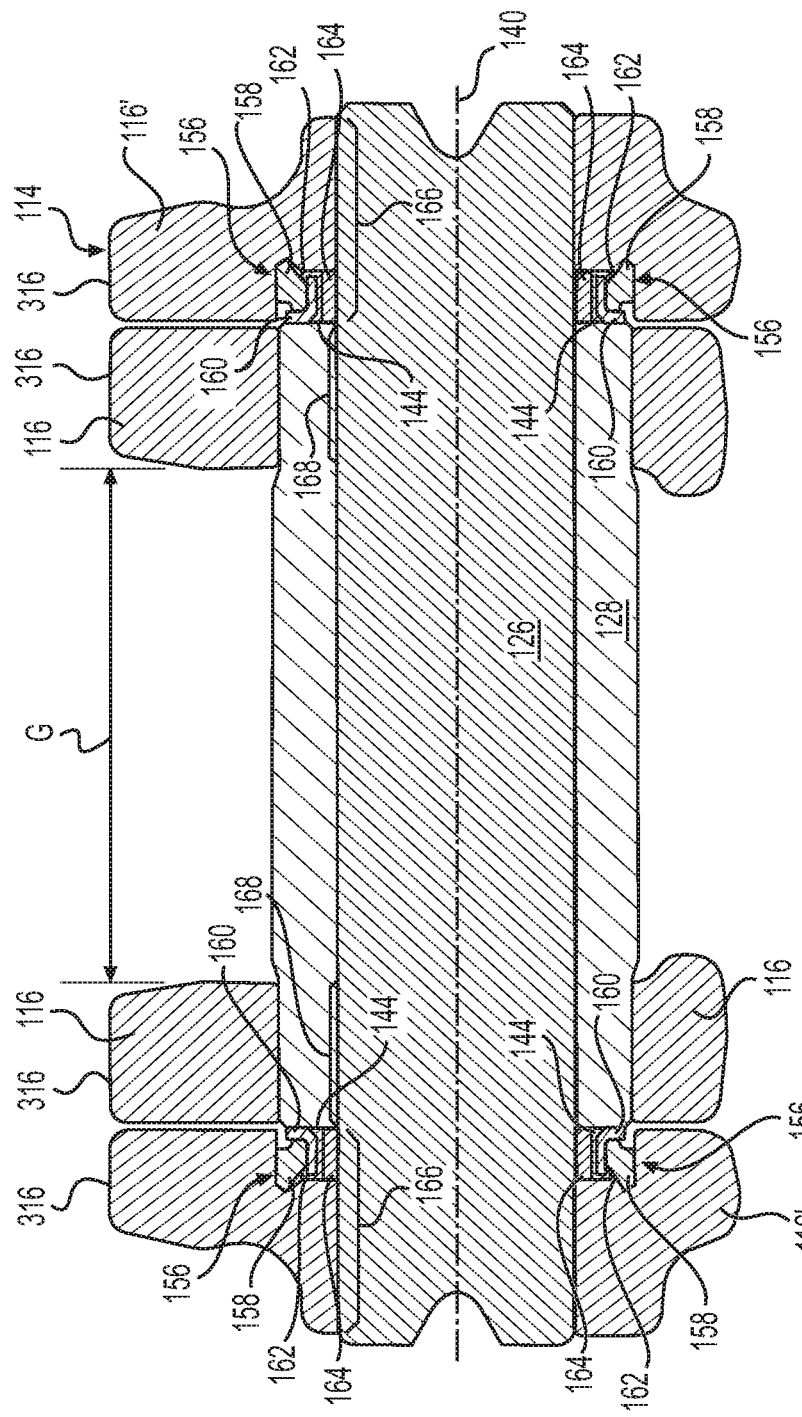
FIG. 13 is a plan sectional view of track links, bushing and track pin similar to that shown in FIG. 12, where the track pin is of solid construction, lacking a central oil groove that runs along its cylindrical axis.

FIG. 13 shows another track link assembly 114 that is known in the art that lacks an oil passage or other void that surrounds the longitudinal axis of the pin. This link assembly 114 includes a seal assembly 156 that includes first and second seal members 158, 160 that provide sealing between the inboard end collars 146 of the outboard link and the bushing 128. Each of the seal assembly 156 is disposed within each of the counterbores 162 between the shoulder 164 of the counterbore and the adjacent outer end face 144 of the bushing 128 and in sealing engagement against the outer end face 144. These type of seals are often referred to as rotating face seals as they allow the bushing to rotate relative to the pin 126 and outboard link while still keeping lubrication from leaking. Also, thrust rings are provided between the pin and seal assembly for reasons already explained above. The pin includes regions that absorb loads from the links either directly or indirectly through the bushing. Specifically, region 166 is in contact with the outboard link 116' while region 168 is in contact with the bushing 128 directly underneath the inboard link.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. An undercarriage for use with a vehicle that includes an endless track drive, the undercarriage comprising:

a track chain including
   a plurality of track pins and track bushings disposed about the track pins; and
   a plurality of track links that are connected to each other by either one of the plurality of track pins or a track bushings, wherein at least one of the plurality of track links defines a plurality of apertures for receiving one of the plurality of track pins or bushings; and
an idler wheel including
   a main body that includes a generally cylindrical configuration defining an axis of rotation, a circumferential direction and a radial direction, the main body including
      a central portion disposed along the axis of rotation defining a radial extremity of the central portion; and
      at least a first outside portion disposed along the axis of rotation that includes an undulating circumferential perimeter including a plurality of apexes and valleys, wherein the undulating circumferential perimeter is exposed and configured to contact the plurality of track links of the track chain tangentially while also being spaced away from each of the plurality of track bushings.

2. The undercarriage of claim 1 wherein the undulating circumferential perimeter defines a radial extremity of the first outside portion of the idler wheel, wherein the radial extremity of the central portion is further away from the axis of rotation than the radial extremity of the first outside portion.

3. The undercarriage of claim 1 wherein the main body portion includes a second outside portion that is positioned on the axially opposite side of the central portion compared to the first outside portion, wherein the second outside portion is similarly configured as the first outside portion.

4. The undercarriage of claim 3 wherein the main body of the idler wheel defines an axial plane centered on the axis of rotation of the idler wheel and the idler wheel is symmetrical about the axial plane.

5. The undercarriage of claim 1 wherein the undulating circumferential perimeter includes a plurality of apexes and valleys, and wherein a curve may be defined about the circumferential perimeter of the first outside portion that is tangent to every apex of the undulating circumferential perimeter.

6. The undercarriage of claim 5 wherein the curve is a circle.

7. The undercarriage of claim 6 wherein the track chain defines a track chain length and the circle defines a circumferential length, and wherein the track chain length divided by the circumferential length of the circle yields a non-integer value.

8. The undercarriage of claim 5 wherein the undulating circumferential perimeter includes a plurality of curve segments, wherein each curve segment includes an arcuate shape.

9. The undercarriage of claim 5 wherein the undulating circumferential perimeter includes an odd number of apexes.

10. The undercarriage of claim 1 wherein the plurality of apexes and valleys includes one apex that is circumferentially adjacent to the next apex and the linear circumferential distance from one apex to the next apex is the same about the entire circumferential perimeter of the first outside portion of the idler wheel.

11. The undercarriage of claim 10 wherein the undulating circumferential perimeter comprises a circular array of repeating geometrical apexes and valley about the axis of rotation.

12. The undercarriage of claim 11 wherein the undulating perimeter includes a sinusoidal waveform defining a radial amplitude and a half wavelength, and the radial amplitude ranges from 5 mm to 10 mm and half wavelength ranges from 10 mm to 160 mm.

13. The undercarriage of claim 1 wherein the plurality of track links includes a rail portion that is configured to complimentarily mate with the circumferentially undulating perimeter of the first outside portion of the idler wheel.

14. The undercarriage of claim 13 wherein each one of the plurality of track links includes a rail portion comprising an undulating surface that is configured to complimentarily mate with the circumferentially undulating perimeter of idler wheel.

15. The undercarriage of claim 1 wherein the undulating circumferential perimeter is uninterrupted along the circumferential direction of the idler wheel.

16. The undercarriage of claim 1 wherein the idler wheel further includes a hub portion.

17. The undercarriage of claim 1 wherein each one of the plurality of track links includes a rail and the idler wheel further comprises a flange that is positioned closely to the axially outside portion of the rail, being configured to help prevent axial movement of the track chain assembly with respect to the idler wheel.

18. A machine comprising:
an undercarriage including
   a track chain including
      a plurality of track pins and track bushings disposed about the track pins; and
      a plurality of track links that are connected to each other by either one of the plurality of track pins or a track bushings, wherein at least one of the plurality of track links defines a plurality of apertures for receiving one of the plurality of track pins or bushings; and
   an idler wheel including
      a main body that includes a generally cylindrical configuration defining an axis of rotation, a circumferential direction and a radial direction, the main body including
         a central portion disposed along the axis of rotation defining a radial extremity of the central portion; and
         at least a first outside portion disposed along the axis of rotation that includes an undulating circumferential perimeter including a plurality of apexes and valleys, wherein the undulating circumferential perimeter is exposed and configured to contact the plurality of track links of the track chain tangentially.

19. The machine of claim 18 wherein the plurality of track links includes a plurality of offset links.

20. The machine of claim 18 further comprising a drive sprocket that is elevated vertically above the idler wheel.

* * * * *